United States Patent [19]

Skillman et al.

[11] Patent Number: 5,506,999
[45] Date of Patent: Apr. 9, 1996

[54] EVENT DRIVEN BLACKBOARD PROCESSING SYSTEM THAT PROVIDES DYNAMIC LOAD BALANCING AND SHARED DATA BETWEEN KNOWLEDGE SOURCE PROCESSORS

[75] Inventors: Thomas L. Skillman, Bellevue; Richard N. Blair, Kent; Arthur J. Boland, Issaquah; Yong-Long C. Ling; Richard M. Pier, both of Bellevue, all of Wash.

[73] Assignee: The Boeing Company, Seattle, Wash.

[21] Appl. No.: 310,931

[22] Filed: Sep. 22, 1994

Related U.S. Application Data

[63] Continuation of Ser. No. 824,048, Jan. 22, 1992, abandoned.
[51] Int. Cl.$^6$ ............................. G06F 15/16; G06F 15/18
[52] U.S. Cl. ...................... 395/800; 395/53; 364/DIG. 1; 364/274; 364/274.3
[58] Field of Search ..................................... 395/800, 200, 395/53, 54, 84, 11, 650, 700

[56] References Cited

U.S. PATENT DOCUMENTS

| | | | |
|---|---|---|---|
| 4,547,849 | 10/1985 | Louie et al. | 364/200 |
| 4,809,346 | 2/1989 | Shu | 382/49 |
| 4,809,347 | 2/1989 | Nash et al. | 382/49 |
| 4,862,407 | 8/1989 | Fette et al. | 364/900 |
| 4,868,763 | 9/1989 | Masui et al. | 395/11 |
| 4,877,940 | 10/1989 | Bangs et al. | 395/11 |
| 4,884,217 | 11/1989 | Skeirik et al. | 395/11 |
| 4,893,234 | 1/1990 | Davidson et al. | 395/800 |

(List continued on next page.)

OTHER PUBLICATIONS

Fennell, Richard D. et al., "Parallelism in Artificial Intelligence Problem Solving: A Case Study of Hearsay II," IEEE Transactions on Computers, vol. C–26, No. 2, Feb. 1977, pp. 98–111.

Article entitled "The CODGER Whiteboard System," pp. 4–8.

E. Oliveira et al, "Controlling Cooperative Experts in a Real Time System", IEE, London, UK, Third International Conference on Software Engineering for Real Time Systems (Conf. Publ. No: 344, pp.: 176–181; 16–18 Sep. 1991.

Vibhu O. Mittal et al, "Scatter–Brain: An Experiment in Distributed Problem Solving applied to Load Balancing", IEEE Computer Soc. Press Washington D.C., Proceedings of the 13th Annual International Computer Software and Applications Conference (Cat. No.: 89OH2763-3) Conference Date: 20–22 Sep. 1989, pp. 760–766.

*Primary Examiner*—Mehmet Geckil
*Attorney, Agent, or Firm*—Christensen, O'Connor, Johnson & Kindness

[57] ABSTRACT

A blackboard parallel processing system for carrying out a general processing task using a plurality of parallel processors. In one application of the blackboard processing system, a workstation (102), which is part of an an automated workstation manufacturing system (AWMS), includes a blackboard control unit (BCU) (106) on which four separate functions are implemented in separate identical modules. The BCU includes a database module (34) having access to a global database, which is available to each of the plurality of parallel processors, referred to as knowledge source processors (KSPs) (40). A trigger module (46) includes trigger patterns that are compared to the data developed from messages transmitted by the KSPs to initiate specific tasks according to a predefined sequence. A scheduler module (42) responds to the trigger signals, by transmitting a signal to initiate each task, either by a specified KSP or by the KSP that is the least loaded with previously assigned processing task. A communication module (38) serves as an interface between knowledge source operating systems in each of the KSPs. Applications running in each KSP are initiated in response to the signals provided by the BCU, producing data and using data available to each of the KSPs on the global database.

22 Claims, 6 Drawing Sheets

U.S. PATENT DOCUMENTS

| | | | |
|---|---|---|---|
| 4,893,286 | 1/1990 | Cobb | 367/87 |
| 4,939,648 | 7/1990 | O'Neill et al. | 364/422 |
| 4,943,932 | 7/1990 | Lark et al. | 364/513 |
| 4,953,147 | 8/1990 | Cobb | 367/35 |
| 4,961,133 | 10/1990 | Talati et al. | 395/700 |
| 4,972,314 | 11/1990 | Getzinger et al. | 395/650 |
| 5,016,204 | 5/1991 | Simoudis et al. | 364/578 |
| 5,101,362 | 3/1992 | Simoudis | 395/53 |
| 5,185,861 | 2/1993 | Valencia | 395/200 |
| 5,274,572 | 12/1993 | O'Neill et al. | 364/550 |
| 5,283,857 | 2/1994 | Simoudis | 395/77 |

EVENT DRIVEN BLACKBOARD PROCESSING SYSTEM THAT PROVIDES DYNAMIC LOAD BALANCING AND SHARED DATA BETWEEN KNOWLEDGE SOURCE PROCESSORS

This application is a continuation application based on prior application Ser. No. 07/824,048, filed on Jan. 22, 1992, now abandoned.

FIELD OF THE INVENTION

This invention generally pertains to a parallel processing system, and more specifically, to a parallel processing system that uses a "blackboard" controller.

BACKGROUND OF THE INVENTION

In a conventional computer system, a single processor, sometimes operating with either a built-in or add-on numeric processor carries out predefined instructions to control a machine, process data, or develop a solution to a problem. Although mainframe computers have been developed that achieve relatively high throughput, conventional low-cost desktop computers and minicomputers are typically limited to clock speeds of 33–50 MHz, depending on the type of central processing unit (CPU) employed. The throughput that can be achieved on such processors is too low for many real-time control applications that may include intelligent sensing or recognition of physical elements, complex data structures, extensive communications between elements in the system, and demands for shared data access.

Systems for applications such as real-time radar signal processing and machine control must readily handle fast symbolic computations and provide reliable, high throughput coupled with numeric and symbolic processing. One way to improve the throughput of lower cost computer systems is to use parallel processors that share the computational and control overhead. Unfortunately, prior art system architecture and computing hardware, whether using a single processor or multiple parallel processors, can not efficiently integrate such diverse functions as sensor processing, servo control, pattern recognition, navigation, trajectory planning, adaptive modeling, and reasoning, while still meeting performance throughput requirements.

To achieve these required levels of performance, a different type of processing configuration has been developed in the art. The new configuration is conceptually similar to the paradigm in which a group of people join in a brainstorming session to develop a solution to a problem. In such sessions, a solution is often developed by writing facts and any contributions by the participants on a blackboard so that the data and partial solutions to the problem developed by different members of the group are available to all of the members, thereby more efficiently producing a final solution to the problem. By analogy, the computational software configuration that carries out a comparable function is therefore called a blackboard processing system.

In the blackboard processing system, software components that directly process data to produce portions of a solution or components of the functional endpurpose of the system are referred to as knowledge sources. A multidimensional data structure comprising a centralized data base represents a dynamic problem solution state in the system and is called a blackboard. A blackboard processing system also typically includes a blackboard handler module, which is implemented either as a procedure called as a subroutine or as a process that contains a queue of requests for blackboard operations; the blackboard handler module passes read and write requests between the knowledge sources and the blackboard. This concept is described in detail in "Parallelism in Artificial Intelligence Problem Solving: A case Study of Hearsay II" by Richard D. Fennell and Victor R. Lesser, published in IEEE Transactions on Computers, Vol. C-26, No. 2, February 1977, pp. 98–111. In this paper, the blackboard system is applied to a speech understanding problem and is modeled in a multiprocessor simulation experiment run on a uniprocessor system. A multiprocessor hardware configuration suitable for a blackboard processor system is not disclosed in this reference, although application of the concept to a closely coupled network of asynchronous "simple" processors is discussed and possibly represents the goal of further development by the authors.

In U.S. Pat. No. 4,809,346 and a related U.S. Pat. No. 4,809,347, a computer vision architecture is disclosed. The system described in these two patents includes a host computer, a general purpose processor array, an intermediate communications processor, and content-addressable array parallel processors connected in a hierarchical configuration. The lowest order content-addressable array parallel processor operates on a pixel-per-processing element basis, while the higher level processors operate on successively larger segments of a pixel matrix and provide a relatively more symbolic processing function. In these references, a symbolic pixel array is referred to as "a blackboard" data structure that represents information at both the pixel level and the object level. However, the configuration disclosed in the two patents is not a blackboard processing system.

In U.S. Pat. No. 4,862,407, digital signal processing apparatus are disclosed that include a host processor in communication with a plurality of coprocessors via a corresponding plurality of dual port memory circuits. The reference states that the dual port memory elements serve the purpose of an intelligent blackboard or calculator to the host processor. However, the system described in this reference is not a blackboard processing system according to the normally accepted definition of the phrase, because the dual port memory circuits are not intelligent (i.e., do not carry out any processing or logic function), and the memory circuits do not monitor the state of the data input to a coprocessor or respond to the data output from the processor to activate further processing tasks. The use of the term "blackboard" in the three patents identified above is illustrative of the relatively wide variation in meaning that this terminology has in the prior art.

Consistent with the traditional model of a blackboard processing system, a plurality of independent processors should cooperate in solving a problem by posting data on a global blackboard data structure. In response to events occurring either externally or as a result of output from the processors, the global blackboard data structure should control the problem-solving activities of the processors, thereby dynamically adapting the tasks carried out by the processors to the current state of the solution. The blackboard processing system should be adaptable to solve new problems by simply reprogramming the system with appropriate parallel processing algorithms. Currently, no system of this power and flexibility exists in the prior art, except as defined by highly conceptual models that do not realistically have the capacity to achieve the required computational power that is an object of a true blackboard processing system. Accordingly, it should be apparent that a novel combined multiprocessor hardware and software system is needed to meet the demand for a faster, more powerful, and more highly integrated parallel processor system appropriate to achieve the expectations of the blackboard system paradigm.

The foregoing aspects and many of the attendant advantages of the present invention will become apparent by reference to the accompanying drawings and the Detailed Description of the Preferred Embodiments that follows.

SUMMARY OF THE INVENTION

In accordance with the present invention, a blackboard processing system is defined that comprises a plurality of knowledge source processors (KSPs) configured for parallel processing of computational tasks, so that while one KSP carries out a computational task, another KSP carries out a different computational task. The system further comprises a blackboard control unit (BCU) that includes a plurality of functional hardware modules. For example, database means are provided for storing and retrieving data received from the KSPs. Communication means convey data to and from specific KSPs and to and from the database means, serving also to transmit instructions to the KSPs. Trigger means respond to data presented to and stored by the database means, producing a trigger signal upon the occurrence of a predefined condition indicated by that data. Scheduler means are connected to receive the trigger signal and to transmit appropriately responsive instructions through the communication means to the KSPs. These instructions cause a selected KSP to carry out a specific computational task. A communication channel connects the communication means with the KSPs and serves to convey instructions and data between the BCU and the KSPs.

The scheduler means are further operative to cause data required by the selected KSP for carrying out the specific computational task to be transmitted through the communication means to the selected KSP. In response to a request for data received from the KSPs through the communication means, the database means retrieve data for transmission back to the KS P that made the request.

Functional modules comprising the database means, the communication means, the trigger means, and the scheduler means are preferably interchangeable. These functional modules each comprise a CPU, an electronic memory, and a communications interface. In one preferred form of the invention, any function performed by one of the database means, the communication means, the trigger means, and the scheduler means is effected by a plurality of the functional modules cooperating together to accommodate higher levels of processing activity required for performing the function. To define the tasks performed by each functional module in the blackboard processing system, the electronic memory stores a plurality of machine instructions that determine whether a specific functional module operates as the trigger means, the communication means, the database means, or the scheduler means. The functional modules are interconnected by a plurality of serial data links to facilitate high-speed data interchange between them.

Each KSP includes memory means for storing a knowledge source operating system (KSOS). The KSOS interprets instructions received from the BCU so that those instructions can be run by the KSP and translates between a data format used by the KSP and a clam format used by the BCU, if the formats are different from each other. The specific computational tasks that the KSPs are instructed to carry out by the scheduler means each comprise a portion of an overall application or problem that the blackboard processing system is running. The data used by the KSP in carrying out the specific computational tasks are stored by the database means so that such data are available to all of the KSPs. At times, the scheduler means assign a specific computational task to one of the KSPs, and select one of the KSPs to carry out the specific computational task based on its computational capabilities and availability at the time of the selection.

DETAILED DESCRIPTION OF THE PREFERRED EMBODIMENTS

Figure 1:
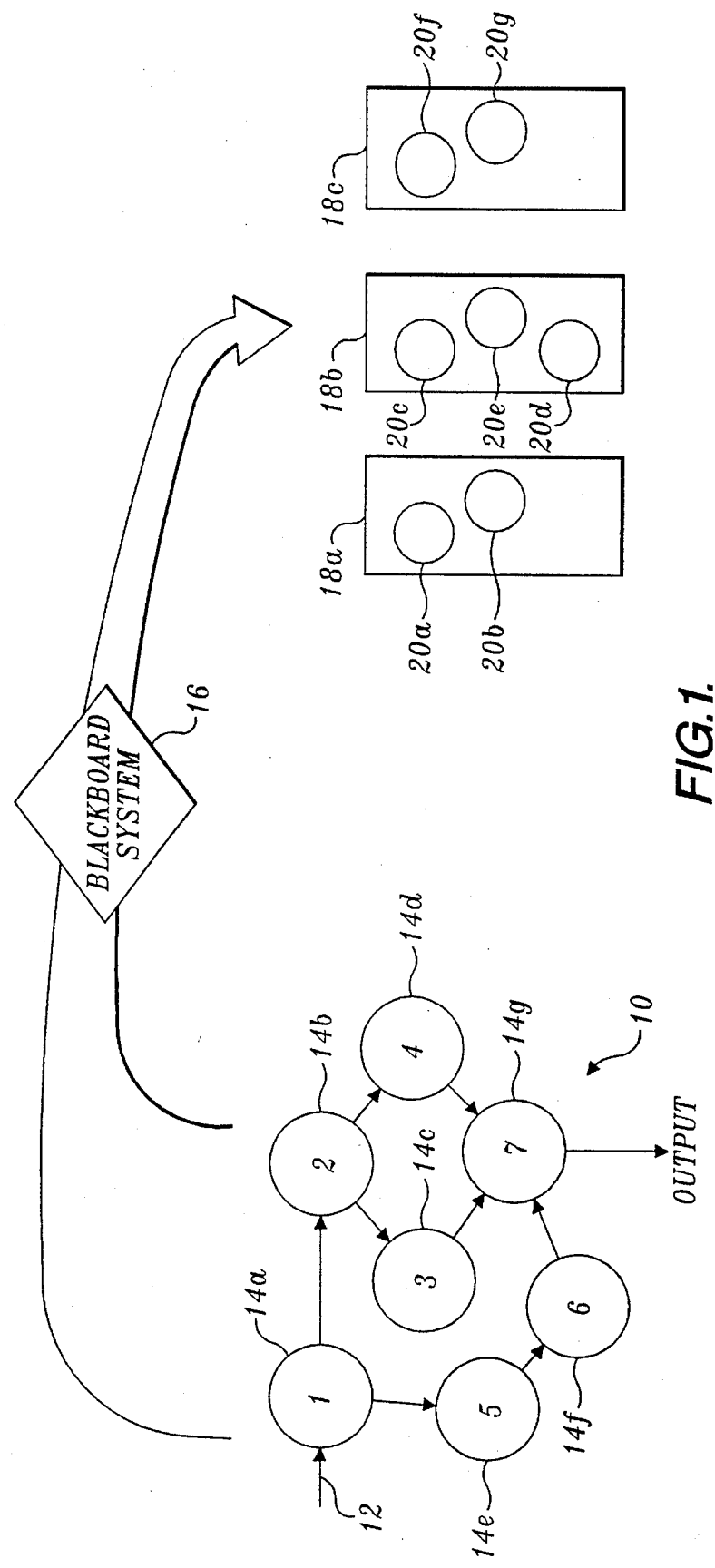
FIG. 1 is a symbolic representation illustrating the functional operation of a blackboard processing system in accordance with the present invention.

In FIG. 1, a blackboard system paradigm 10 graphically illustrates the concepts behind the present invention. In this illustration, an input signal 12, representing an external stimulus or event, is applied to initiate a general processing task that includes seven different event driven applications 14(a) through 14(g). For purposes of illustration, only a single input signal 12 is shown in FIG. 1; however, it should be apparent that a plurality of such input signals representing stimuli from different sources could be applied to initiate different ones of the event driven applications 14. Event driven application 14(a) processes the input signal and produces two outputs, which are applied as inputs to event driven applications 14(b) and 14(e). Event driven application 14(b) similarly produces two outputs in response to this applied input, and these outputs in turn are used to initiate event driven applications 14(c) and 14(d) to produce their own outputs. Both of these outputs are applied as inputs to event driven application 14(g).

The input applied to event driven application 14(e) stimulates it to produce an output, and in response to this output, an event driven application 14(f) is initiated that produces an output applied as a third input to event driven application 14(g). In response to its three applied inputs, event driven application 14(g) produces a final output based upon the contributions of each of the previously executed event driven applications and thus, the solution or result to the general processing task.

The interaction between the event driven applications, the exchange of data, and other signals between them to which they respond by beginning their contributory processing, and their scheduling as required for sequential processing of the outputs representing each step of the general processing task are all organized under a blackboard processing system 16 that maps the event driven applications into three possibly heterogeneous parallel computing modules 18(*a*) through 18(*c*). Each event driven application can be characterized as a "knowledge source" because it produces a signal or data required in completing the general processing task.

The blackboard processing system thus includes seven knowledge sources 20(*a*) through 20(*g*). Knowledge sources 20(*a*) and 20(*b*), corresponding to event driven applications 14(*a*) and 14(*b*), run in computing module 18(*a*), while knowledge sources 20(*c*) through 20(*e*), corresponding to event driven applications 14(*c*) through 14(*g*), run in computing module 18(*b*). The remaining two knowledge sources 20(*f*) and 20(*g*) correspond to event driven applications 14(*f*) and 14(*g*), which run in computing module 18(*c*). Under blackboard processing system 16, at any given time, various knowledge sources can be running in parallel and accessing a common database, thereby enabling them to use the output from other knowledge sources that have concluded their processing and any other data required to carry out a portion of the general processing task. Blackboard processing system 16 organizes the interaction between knowledge sources 20, ensuring that the appropriate input is applied to each knowledge source when required to enable it to provide its contribution to the general processing task, thereby running each of the event driven applications in an effective and efficient manner.

Figure 2:
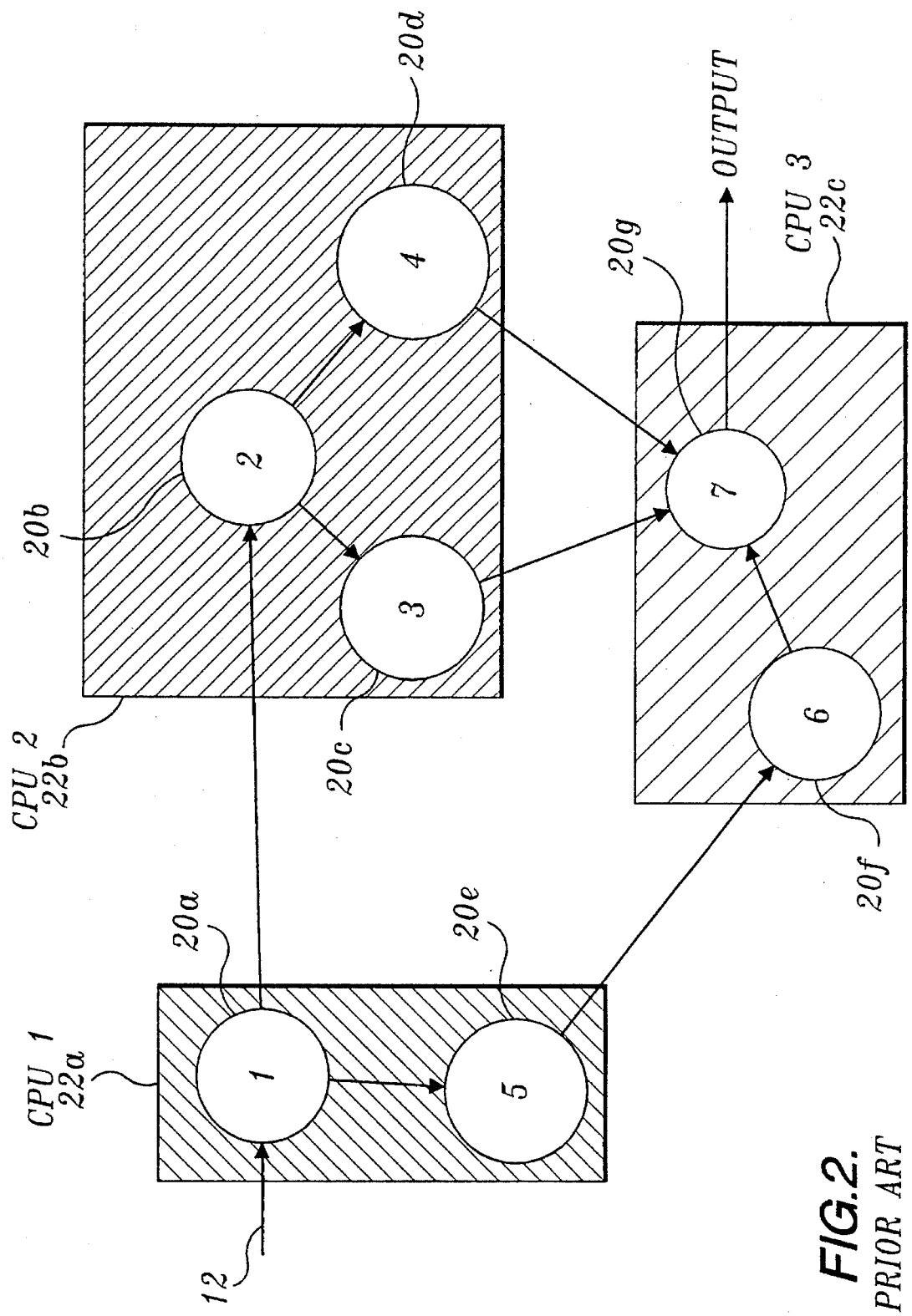
FIG. 2 is block diagram symbolically showing the prior art approach to mapping of functions implemented by software onto blocks, each block representing a separate CPU.

FIG. 2 illustrates how the application processes (corresponding to knowledge sources in the present invention) would typically be implemented in the prior art approach to blackboard processing. The three different CPUs 22(*a*) through 22(*c*), correspond to computing modules 18(*a*) through 18(*c*) shown in FIG. 1. As illustrated in FIG. 2, application processes 20(*a*) through 20(*g*) would be permanently mapped onto parallel CPUs 22(*a*) through 22(*c*). The arrows that extend between application processes represent both the flow of control and data therebetween. In this prior art approach, the arrows shown within a CPU represent the flow of control and data that supported by the local operating system of that CPU. However, the arrows between separate CPUs in the prior art would have to be implemented by custom code developed specifically for the collection of CPUs, their operating systems, and the programming languages used in the various application processes. Any changes or enhancements to the prior art system are likely to be expensive, since custom linkages between the CPUs and the application processes must be individually modified. By contrast, blackboard system 16 (FIG. 1), comprising the present invention, provides a modular framework for integrating knowledge source processors and knowledge source processes that includes: a centralized event driven control flow, a standard shared data representation, dynamic load balancing, and simple programming language interfaces.

Figure 3:
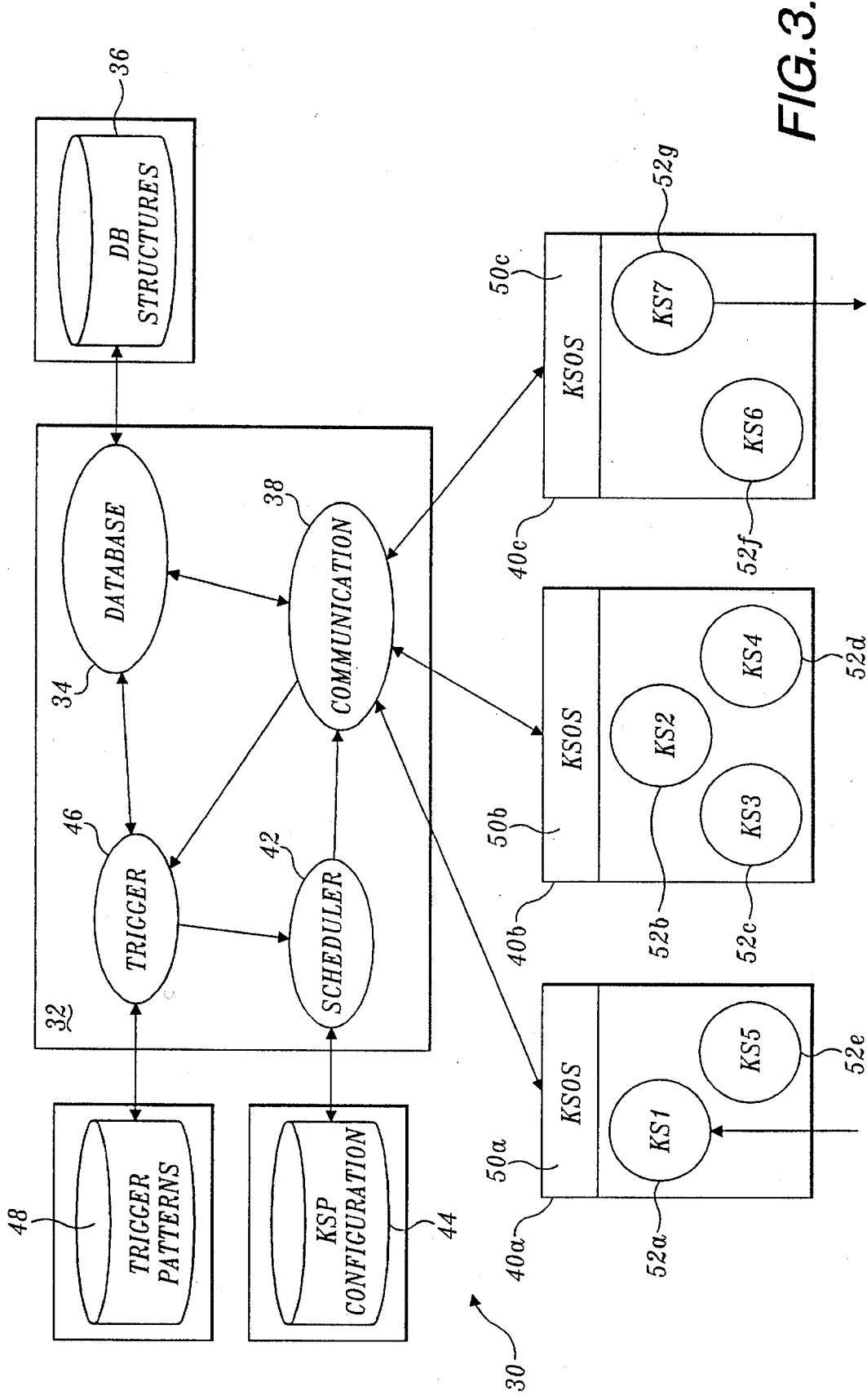
FIG. 3 is a schematic block diagram that illustrates the blackboard processing system in terms of the functional components of the system.

A block diagram illustrating the primary software functions implemented in the blackboard processing system is shown generally at reference numeral 30 in FIG. 3. In blackboard processing system 30, a BCU 32 is responsible for four separate primary functions. These functions are defined by software and include a database module 34 that accesses database structures 36 to determine the format for dam stored and presented in the database available to service the knowledge sources. The second functional component of BCU 32 is a communications module 38, which acts as a communications interface between the BCU and a plurality of KSPs 40(*a*) through 40(*c*).

Database module 34 ensures that a common database is available to all of knowledge sources and is in bidirectional communication through the communication module 38 with each of the KSPs to provide them with data that the knowledge sources may require. The database module also receives the processing results from the KSPs for storage in the database, making the results readily available to other KSPs in the blackboard processing system when needed.

The remaining two functional modules comprising BCU 32 are a scheduler module 42 and a trigger module 46, both of which are required to determine the sequence and allocation of knowledge sources run by blackboard processing system 30. Scheduler module 42 accesses a KSP configuration data set 44 to keep track of the specific configuration of knowledge sources running in the blackboard processing system and for allocation of knowledge sources among the KSPs. For example, in certain applications, it may be necessary to assign a specific knowledge source to a specific KSP because of related devices attached to that KSP that are controlled by that knowledge source; the KSP configuration data set would then include data prohibiting the knowledge source being assigned to a different KSP.

A knowledge source is sometimes activated by BCU 32 in response to a trigger signal received from trigger module 46. For each general processing task carded out by blackboard processing system 30, a set of trigger patterns 48 are defined for subsequent access by trigger module 46. Each time that one of the knowledge sources posts a message or other output data to the database, it is compared to trigger patterns 48 and if a match is found, a trigger signal associated with the match is supplied to scheduler module 42. Scheduler module 42 responds by sequentially initiating a knowledge source that needs the data now available in the database in order to run.

Each KSP 40(*a*) through 40(*c*) includes a corresponding KSOS 50(*a*) through 50(*c*), respectively. Although the KSPs may be of the same type (e.g., MOTOROLA™, Type 68020 CPUs), in other cases, they can alternatively comprise several entirely different types of CPUs. For example, one KSP may comprise a CPU selected for its ability to run a specific knowledge source or to control a specific manufacturing device. If the CPU comprising a KSP is of the multi-tasking type, a plurality of knowledge sources can be run concurrently on a single KSP. Regardless of the type of CPU comprising the KSPs, the KSOS is functionally the same on each, although comprising specific machine instructions appropriate to the type of CPU in use, whether made by INTEL™, MOTOROLA™, or some other manufacturer. Knowledge sources 52(*a*) through 52(*g*) run under the KSOS and are generally insulated from direct interaction with BCU 30 by it. Consequently, the knowledge sources may be written in software that runs on only one type of processor, which may be different than the processors used in the BCU.

It is possible to simplify the KSOS by making use of the local operating system running on a KSP. The KSOS in this case is simply a process that receives messages from the BCU via the local operating system (OS), processes them, and then makes requests of the local OS to create new knowledge sources or to communicate with Knowledge sources that are already running. This approach simplifies the development of KSOSs for KSPs that have a local operating system, such as UNIX, VxWorks, or VERTEX.

Carrying the example presented initially in FIG. 1 into the block diagram for the blackboard system shown in FIG. 3, seven knowledge sources 52 are included, distributed between the KSPs 40. Thus, knowledge sources 52(*a*) through 52(*g*) run in a combination of parallel and serial sequences, each being assigned to one of the KSPs by BCU 32, consistent with the KSP configuration data set 44. Furthermore, the knowledge sources are initiated when the output from another knowledge source matches one of trigger patterns 48. Accordingly, after knowledge source 52(*a*) completes the processing of the input signal producing an output, trigger module 46 compares the output to a predefined set of patterns, and if a match is found, triggers scheduler module 42. In response to a trigger signal produced by the trigger module, scheduler module 46 ensures that the output from knowledge source 52(*a*), which was transferred through communications module 38 to database module 34, is made available to both knowledge source 52(*e*) within KSP 40(*a*) and knowledge source 52(*b*) within KSP 40(*b*), initiating both of these latter knowledge sources to begin processing.

When knowledge source 52(*b*) completes its processing task, its output is transferred through communications module 38 to database module 34. A match between this output and a trigger pattern causes trigger module 46 to produce another trigger signal. In response to this trigger signal, scheduler module 42 transfers the data output from knowledge source 52(*b*) to knowledge sources 52(*c*) and 52(*d*). In a similar fashion, each of the knowledge sources implemented within the KSPs are initiated in an orderly sequence, and these processes are distributed between the KSPs to run in parallel when possible, so as to efficiently complete the general processing task.

It should be apparent that the paradigm described above represents a relatively simplistic application of KSP system 30, intended to illustrate the combination of sequential and parallel processing that can be carried out by KSPs 40 to efficiently solve the general processing task. For other applications, each of the KSPs may run completely unrelated aspects of the general processing task and the knowledge sources being implemented by each KSP can change in a much more dynamic fashion to meet the requirements for solving or carrying out the general processing task in the most efficient manner.

Figure 4:
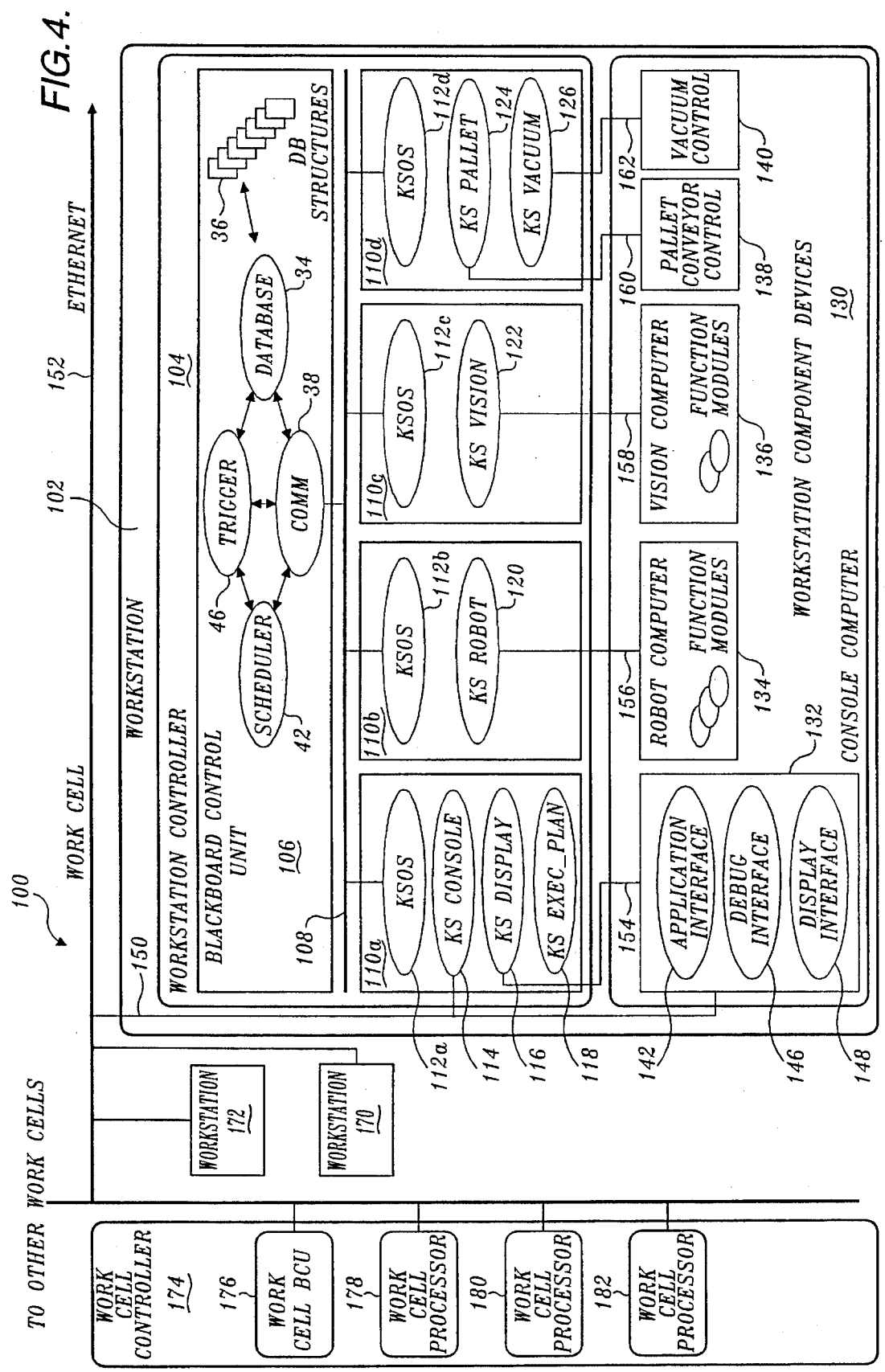
FIG. 4 is a schematic block diagram showing part of an automated workstation manufacturing system (AWMS) that incorporates the blackboard processing system according to the present invention.

An example of a more complex processing task is illustrated in FIG. 4. In this figure, a portion of an automated workstation manufacturing system (AWMS) that uses the blackboard processing system is illustrated. In the AWMS application, a plurality of work cells 100 are provided, each of which comprises multiple workstations, including workstations 102, 170, and 172, as shown in FIG. 4. Each of the workstations is generally similar to the others in terms of its overall configuration. Details of workstation 102 are shown as an example of the other workstations comprising work cell 100.

An objective of the AWMS is to manage batch manufacturing projects, workstation/device scheduling, and task dispatching with as little human interaction as possible. In addition, each workstation is intended to automatically handle its own setup, device tasking, and takedown-again without significant human intervention. The blackboard processing system is ideal for meeting these goals, since it provides a relatively efficient environment for automating the tasks and processes at the work cell, workstation, and device level.

Each of the work cells comprising the AWMS receives batch orders from a central location or directly from a user, including the priority of batch tasks for execution and scheduling of multiple batch orders, and monitoring and control of tasks performed by any devices controlled by the work cell. In the event that one workstation operation in a work cell depends upon the earlier completion of a batch order by another workstation, the work cell initiates the proper ordering of workstation operations to ensure that the operations are completed in the proper sequence, with minimal delay between operations.

At the workstation level, a workstation controller 104 is responsible for performing workstation tasks as requested by the work cell and for returning requested results or interim data. In this example, the workstation tasks involve operational control of single or multiple manufacturing devices and can be as simple as scheduling and monitoring a single device performing a simple operation, such as a robot arm that drills a hole in a part, or as complex as a task involving many parallel/sequential device operations on a number of different parts of an assembly.

A plurality of workstation devices 130 are controlled by workstation controller 104, including a robot arm, computer vision cameras, pallet conveyor for moving parts and assemblies, vacuum pickup for manipulating parts with the robot arm (none of these devices are separately shown), and a human interface console computer 132. A device operation can include determining settings and control signals required to successfully complete a physical process, such as moving the robot arm, turning on a vacuum pump, or monitoring an image frame produced by one of the cameras. In the example shown in FIG. 4, workstation devices 130 carry out the physical operations under the control of workstation controller 104.

Workstation controller 104 includes a BCU 106 comprising database module 34, communications module 38, scheduler module 42, and trigger module 46. Each of these modules share a common database structure 36, which is accessed through database module 34. BCU 106 is in communication with a plurality of KSPs 110(*a*) through 110(*d*), each of which include a KSOS 112(*a*) through 112(*d*), respectively. The KSOSs execute on each of the KSPs 110 and serve to buffer communications with the global operating system that executes on BCU 106.

Applications programs for controlling the various workstation devices 130 comprise knowledge sources that execute in each of the KSPs 110 and are supported by the local KSOS. For example, in KSP 110(*a*), a knowledge source console application program 114 interfaces with console computer 132, which comprises one of workstation devices 130. Similarly, a knowledge source display application 116 and a knowledge source execution planner 118 also run under KSOS 112(*a*) in KSP 110(*a*). Knowledge source display application 116 is connected to console computer 132 by leads 154 and is operative to drive a display monitor within the console computer.

In KSP 110(*b*), a knowledge source robot application 120 provides a control interface over leads 156 to a robot computer 134, which is programmed to carry out various functions with the robot arm. Knowledge processors 110(*c*) and 110(*d*) also include specific knowledge source applications, including a knowledge source vision module 122 that generates signals carried over leads 158 to direct a vision computer 136 in processing images produced by a plurality of video cameras and in controlling the cameras, and a knowledge source pallet application 124, for providing signals conveyed over lines 160 for controlling a pallet conveyor 138. Knowledge source processor 110(*d*) also includes a knowledge source vacuum application 126 that controls a vacuum system 140 with signals conveyed over leads 162. Vacuum system 140 is selectively activated, for example, to manipulate parts being assembled under the direction of workstation 102. The signals from knowledge source pallet application 124 control a conveyor that can be activated to move a pallet of parts or an assembly into position for further work by other devices.

Console computer 132 includes an application interface 142 to enable a user to modify parameters affecting the task of workstation controller 104. In addition, a debug interface 146 facilitates detection and correction of software errors in any of the knowledge source applications or in the overall schedule of tasks carried out by the workstation. A display interface 148 drives the display monitor on which the current status of the task or of any of the applications being implemented by the knowledge sources is presented to the user and is also used when making changes to the software under which the task is running. Lines 150 are connected to an ETHERNET™ link 152 to facilitate communication between the console computer, the knowledge source console application program 114, and other work cells in the AWMS.

The blackboard processing system in accordance with the present invention is also applied at a higher level in the AWMS, to a work cell controller 174. A work cell BCU 176, which is analogous to BCU 106, controls a plurality of work cell processors 178, 180, and 182. The work cell BCU thus also benefits from distributed parallel processing handled in an efficient manner, which is an attribute of the present invention.

Figure 5:
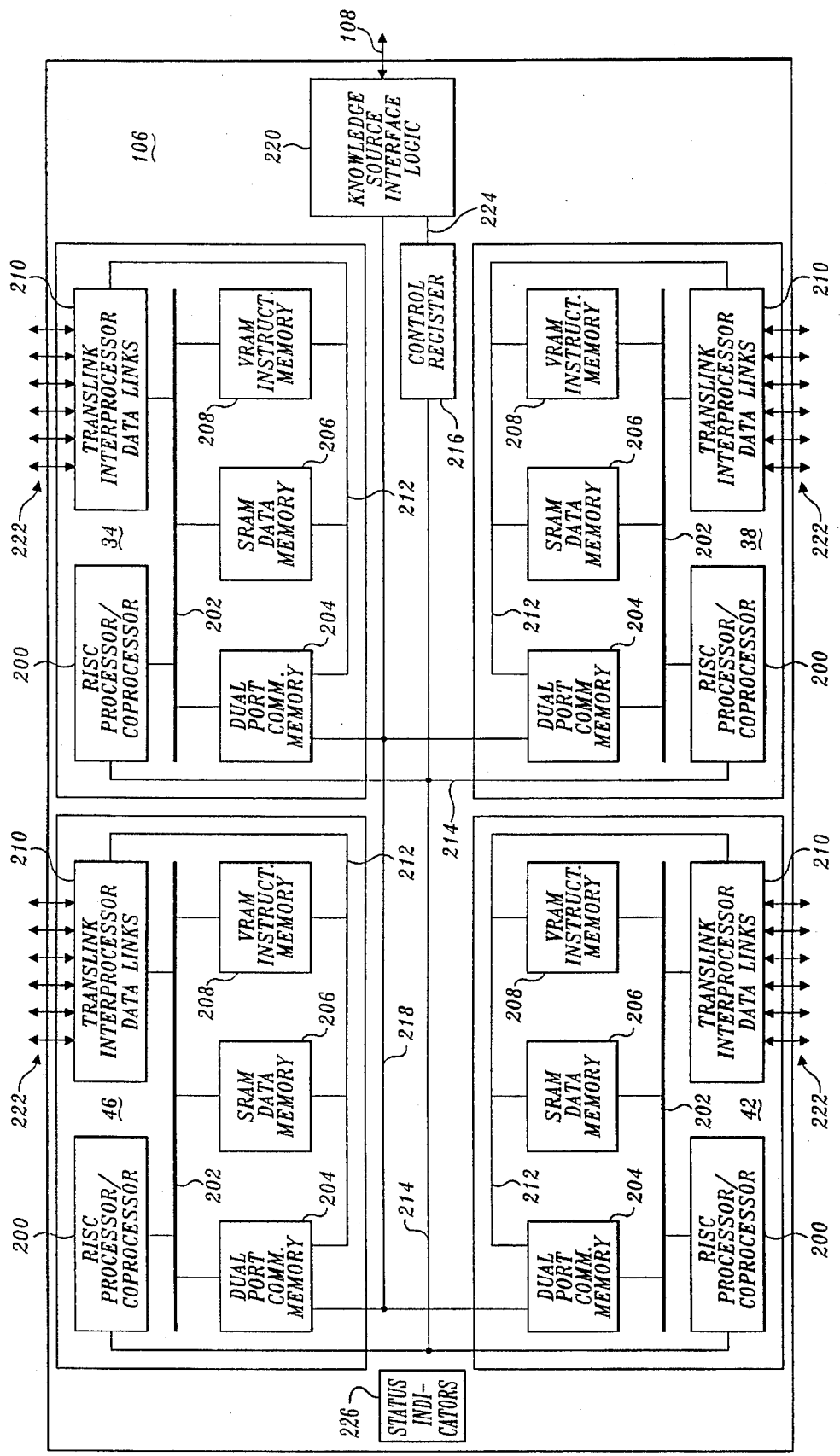
FIG. 5 is a schematic block diagram of a BCU.

Turning now to FIG. 5, details of the hardware used for implementing BCU 106 in a preferred embodiment of the blackboard processing system are disclosed. As noted above, BCU 106 carries out four distinct primary functions, including database management, communications, scheduling of applications or processes, and determination of trigger signals used in the scheduling of those processes. In the preferred embodiment, each of these four functions (which have the same reference numerals as the functions illustrated in FIG. 4) are defined by software executed on four identical modules. Aside from the differences in the software executed on each module, the modules all include the same components and are thus hardware interchangeable. Preferably, the BCU is fabricated on a single printed circuit board that is installed in a backplane (not shown) of work cell BCU 174. The components comprising each module are identified by the same reference numerals to emphasize the interchangeability of the modules.

In the preferred embodiment, database module 34 comprises a reduced instruction set computing (RISC) processor/coprocessor 200, which can comprise an Advanced Micro Devices™ CPU, type AMD 29000. Alternatively, a Motorola™ CPU, type 68020 and type 68082 floating point unit (FPU), preferably operating at 33 Mhz, can be used in this application. It is also contemplated that a Texas Instruments™ digital signal processor (DSP) can be used in place of RISC processor/coprocessor 200. Those with ordinary skill in the art will appreciate that still other processing devices can be used for this purpose.

An internal bus 202 connects RISC processor/coprocessor 200 with each of the other components comprising database module 34, including a dual port communication memory 204, which is responsible for communications between the four modules and the backplane into which the BCU is installed. Internal bus 202 is also connected to a static random access memory (SRAM) 206, which is used to temporarily store data required to carry out the function of database module 34 (or corresponding other functions of the other three modules comprising BCU 106). In the preferred embodiment, the SRAM enables high-speed random accesses to data stored in moderate memory density. A video random access memory (VRAM) 208 stores program instructions used to configure the module to carry out its specific function, i.e., in the case of database module 34, controlling the database accessed by each of the other three modules and by the KSPs comprising the blackboard processing system.

The translink interprocessor data links are an interface to a plurality of serial data lines 222 that interconnect each of the four modules on BCU 106. Lines 212 connect dual port communication memory 204, SRAM data memory 206, and VRAM 208 with the translink interprocessor data links. In the preferred embodiment, translink interprocessor data links 210 comprise an application-specific integrated circuit (ASIC) that includes memory control for: (a) dual port communication memory 204; (b) SRAM data memory 206; and (c) VRAM 208. In addition, translink interprocessor data links 210 include a bus interface for communications with RISC processors/coprocessor 200, a bus arbiter, and a plurality of direct memory access controls for corresponding transmitters and receivers, each connected to separate lines 222 for transfer of data bidirectionally between one of the communication channels and memory. The memory control block within translink interprocessor data links 210 controls all access to all memory connected to RISC processor/coprocessor 200, including instruction memory that is stored within VRAM 208, data memory stored within SRAM data memory 206, and control memory stored within dual port communication memory 204. Data are transmitted over lines 222 by translink interprocessor data links 210 in either 8-, 16-, or 32-bit blocks at a time; however, data transfers between memory and the translink interprocessor data links are made using built-in direct memory access logic and are always 32-bit transfers. (Note: one of the reasons for considering the Texas Instruments™ DSP as a replacement for the RISC processor/coprocessor is that the DSP integrates virtually all of the functions provided by translink interprocessor data links 210. Accordingly, use of the DSP integrated circuit simplifies each of the four modules by eliminating translink interprocessor data links 210 as a separate component in each module.)

Each of the four RISC processor/coprocessors 200 are connected by lines 214 to a control register 216, which serves as an initializer and posts interrupt bits that are transmitted to each of the RISC processor/coprocessors 200 and instructions received from a higher level device (such as work cell controller 174 in FIG. 4). Data lines 224 connect control register 216 to a knowledge source interface logic circuit 220, which interfaces the BCU to the backplane of the controlling device into which it is inserted or to some other external bus. Knowledge source interface logic circuit 220 handles any external signals used by the BCU, including signals from and to the KSPs controlled by the BCU.

A plurality of status indicators 226 are included on BCU 106, each comprising a light emitting diode (LED)—not separately shown. Status indicators 226 are lighted to identify the operating condition of each of modules 34, 38, 42, and 46 comprising BCU 106.

When initialized during boot-up of the blackboard processing system by an external computer that controls a backplane into which BCU 106 is interfaced, a kernel comprising monitor code used during the boot-up process loads through knowledge source interface logic circuit 220 into dual port communication memory 204. By executing the kernel, RISC processor/coprocessor 200 loads additional instructions that define the function performed by each module comprising BCU 106 from the backplane into the four VRAMs 208 comprising the respective modules. The instructions stored in VRAM 208 define the function implemented by each of the modules, which differentiates one module from the other.

For certain applications, it may be more efficient to provide two or more modules to perform one of the four functions implemented by BCU 106. For example, instead of using a single module for database management, two such modules can share this function. The modular nature of the hardware comprising BCU 106 readily facilitates the configuration of the BCU to accommodate different requirements for specific applications, such as adding an additional module to share one of the functions. Since the software loaded into each functional module during the boot-up operation defines the function that the module performs, it should be apparent that the processing tasks implemented by each hardware module are readily adapted and modified to meet the requirements of any particular application.

Figure 6:
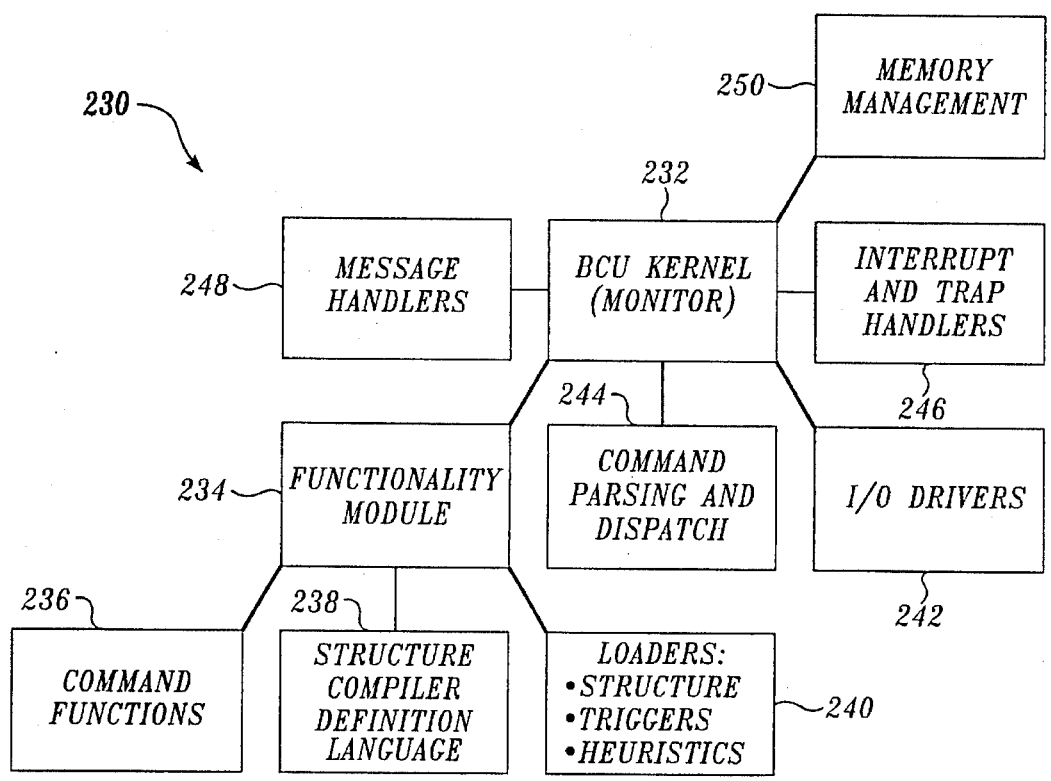
FIG. 6 is a block diagram showing the software modules that comprise a blackboard operating system (used by the BCU)

Although the functions performed by each module are divided into the four areas already discussed above, each module uses an operating system that incorporates a number of common subordinate functions as shown with regard to a block diagram of a BCU operating system 230, illustrated in FIG. 6. BCU operating system 230 includes the BCU kernel (or monitor) 232 which, as explained above, is initially loaded during the boot-up sequence to handle loading of the rest of the operating system, and in particular, to handle the input and storage of instructions necessary to carry out the specific primary function performed by the module. A functionality module 234 includes the machine instructions required to define the function performed by the module. Functionality module 234 executes command functions 236 in carrying out its specified contribution to the BCU, and interprets the commands in accordance with a structure compiler definition language 238. Various other instructions and data comprising loaders for structures, triggers, and heuristics are defined by a block 240 for use by functionality module 234. Input and output drivers are included in a block 242 to enable BCU kernel 232 to deal with the bidirectional transfer of data. Command parsing and dispatch are carried out in accordance with instructions stored in a block 244. Likewise, message handler instructions are included in a block 248, to facilitate passing of messages between the BCU kernel and other portions of the operating system. BCU kernel 232 also responds to interrupts and traps in accordance with handlers stored in a block 246. Finally, a block 250 defines instructions for memory management used by BCU kernel 232.

Figure 7:
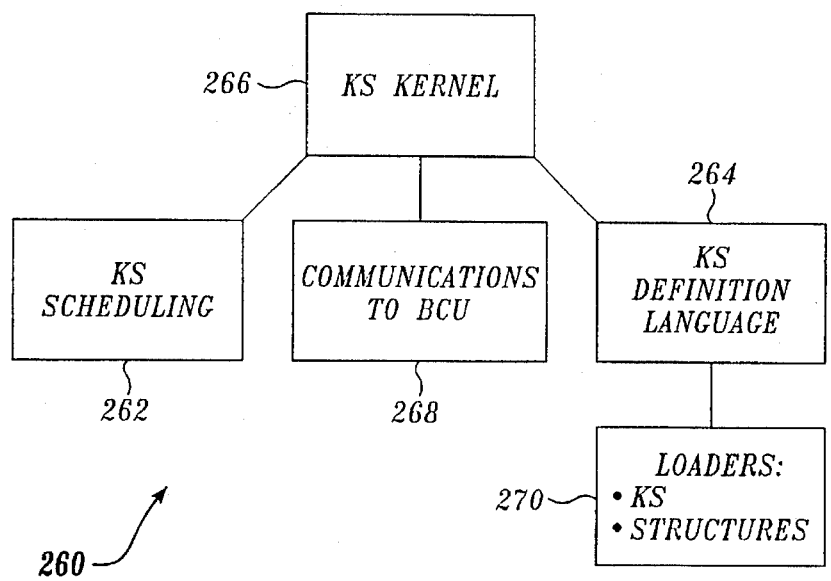
FIG. 7 is a block diagram showing the software modules that comprise an exemplary KSOS (used by a KSP in the blackboard processing system).

As noted above, each KSP includes a KSOS shown generally at reference numeral 260 in FIG. 7. KSOS 260 serves as an interface between BCU 106 and the applications (knowledge sources) run by the KSPs, so that the BCU appears essentially to be a black box to the knowledge sources. A KSOS kernel 262 comprises a basic monitor for KSOS 260 and handles communications with the BCU, as indicated in a block 268. A block 266 defines the knowledge source scheduling controlled by kernel 262 in connection with instructions received from the BCU. Knowledge source language definitions are provided in a block 264, with access to loaders 270 for each of the knowledge sources and structures implemented by the KSP.

In the preferred embodiment, a set of global data structures are defined in a file DATABASE.DEFS and this set of global data structures is used for sharing information between the knowledge sources. Associated with each knowledge source is a set of global trigger definitions defined in a file TRIGGER.DEFS. These trigger definitions are matched against all of the global database operations so that the trigger module can determine the sequencing of operations by comparing the data posted to the database module with the trigger definitions. The global database and global triggering data are precompiled and loaded in the BCU during startup.

Knowledge sources access global data by instructing the KSOS to perform global database functions, i.e., to read data from the BCU 106, which are then placed into a local data structure, or to write data to the database module of the BCU using a local data structure. The global database functions and global scheduler functions are defined in the C language, in Table 1 below.

TABLE 1

|  | Async | Sync | Rtn_value | Error_rtn_value |
|---|---|---|---|---|
| Global Database Functions | | | | |
| create_instance(struc_ptr,inum_ptr);<br>    char *struct_ptr;<br>    int *inum_ptr; | — | X | ptr to T_msgbuf | −1 |
| delete_instance(struct_id,inst_num);<br>    int struct_id,inst_num; | X | — | void | na |
| find_instance(struct_ptr,return_list);<br>    char *struct_ptr;<br>    int return_list[ ]; | — | X | ptr to int array | −1 |
| read_database(struct_ptr,inst_num);<br>    char *struct_ptr;<br>    int inst_num; | — | X | ptr to T_msgbuf | −1 |
| write_database(struct_ptr,inst_num);<br>    char *struct_ptr;<br>    int inst_num; | X | — | void | na |
| write_database_wait(struct_ptr,inst_num) | — | X | ptr to T_msgbuf | −1 |
| Global Scheduler Functions | | | | |
| star_ks(me,struct_ptr);<br>    int me;<br>    char *struct_ptr | X | — | ptr to T_msgbuf | −1 |
| stop_ks( ); | X | — | void | na |

Note:

(a) All global functions cause a message send from the KSOS to the BCU.

(b) All sync global function result in a wait by the KSOS for a reply message from the BCU.

Operations on local copies of the global data are performed through local database functions within the KSOS. The knowledge sources instruct the KSOS to signal BCU 106 when an application has been started and when it is finished, by performing start and stop global scheduler functions, as indicated in Table 1. Trigger messages are passed through the KSOS by scheduler module 43 to the knowledge sources by putting the messages into a trigger message buffer within the KSP. In addition, the knowledge sources instruct the KSOS to retrieve these messages through local scheduler functions, as shown in Table 2 below.

system function calls to access global database and scheduler information. Each knowledge source is independent of any other task, except for information or data that are required and which must first be generated by a previously executed knowledge source. Communication between knowledge sources running in different KSPs is supported indirectly through trigger messages from the BCU. Any knowledge source requiring notification of a global data element update defines a trigger condition that is used by trigger module 46 in the BCU to ensure all updates to the global data are sent by the BCU to the knowledge source in a trigger message.

A knowledge source comprises three main files, the first a global database definition file, the second a global trigger and scheduler file, and the third application code that defines the program or application executed by the knowledge source. Knowledge sources are of two types, including a

TABLE 2

|  | Async | Sync | Rtn_value | Error |
|---|---|---|---|---|
| Local Database Functions |  |  |  |  |
| make_struct_name(struc_ptr);<br>    char *struct_ptr; | X | — | alloc. local mem for global data | −1 |
| discard(data_ptr);<br>    char *data_ptr; | X | — | free local struct or msg from mem |  |
| export(struc_ptr,attr_ptr);<br>    char *struct_ptr,*attr_ptr; | X | — | int −> use before global read |  |
| set_and_export(struct_ptr,*attr_ptr,*val_ptr;<br>    char *struct_ptr,*attr_ptr,*val_ptr; | X | — | int −> use before global write |  |
| in_message(struct_ptr,attr<ptr,msg_ptr);<br>    char *struct_ptr,*attr_ptr,*msg_ptr; | X | — | 1 true, 0 false | −1 |
| Local Scheduler Functions |  |  |  |  |
| get_trigger(struct_ptr);<br>    char *struc_ptr | — | X | ptr to T_msgbuf | −1 |
| get_trigger_no_wait(struc_ptr);<br>    char *struct_ptr | X | — | ptr to T_msgbuf or 0 | −1 |

Note:

(a) All local functions are handled by KSOS and do not communicate with BCU.

(b) Get_trigger tells KSOS to reply when a trigger message from the BCU is received for this knowledge source.

(c) Get_trigger_no_wait tells KSOS to reply with trigger message or if no trigger message is received.

In the above Table, global KSOS instructions are used for communicating with BCU 106, while local KSOS instructions are not.

The global scheduler instructions shown in Table 1 above are used by the applications to inform the BCU that a knowledge source has started or stopped, a start instruction causing the KSOS to send a "Start Successful" message to the BCU and to await a trigger message in return. A pointer to the first trigger message from BCU 106 is returned as a result of a start signal, or alternatively, a −1 to indicate that an error has occurred. The pointer to the trigger message structure (T_msg_buf) is assigned to a trigger message structure pointer (msg_ptr). This assignment enables the knowledge source to access information about the trigger message. The local scheduler instructions shown above in Table 2 enable the BCU to inform a knowledge source of a trigger message.

For a given general task to be carried out by the blackboard processing system, each of the applications or knowledge sources executed by the KSPs can be considered as a collection of coarse-grained tasks with their own set of spawn-always, which is initiated every time that an appropriate trigger signal is received from the BCU, resulting in the possibility that a plurality of independent knowledge sources, each with their own copy of execution codes and unique data on which to operate, are executed in response to the trigger signal, and a spawn-once knowledge source, which is initiated one time by BCU 106 after the first trigger condition is detected, and then subsequently initiated each time that the trigger condition is detected. BCU 106 maps spawn-always knowledge sources to the least loaded KSP, while a spawn-once knowledge source may need to be mapped to a specific KSP to accommodate requirements for hardware associated with that KSP. Each knowledge source can be thought of as an object that must be sent a trigger message by the scheduler module in the BCU in order for the knowledge source to execute.

A knowledge source finishes executing an application by updating its local dam, by controlling one of the external devices 130, by producing an output that is posted by database module 34 to the global shared database, or any combination of these operations. All of the code and local data associated with a specific knowledge source are private to that knowledge source, and all communication between knowledge sources is supported by a message passing through a simple interface to the database module in the global KSOS.

The global database structures allocated and managed by the BCU are defined in the file DATABASE.DEFS. All accesses to the global database structure by the knowledge sources occur through messages sent between BCU 106 and the KSOS. The format of a typical global database definition in the language C with comments is as follows:

```
Define-structure part                        /*symbolic name of structure is part*/
        :max-instances  10                   /*< = 10 parts (< = 256 bytes/part)*/
        :attributes                          /*list of attr/value pairs (< = 1024 bytes)*/
        /Symbol        Type       Default Value    (Max Bytes-String only)/

((name           :string    "a_part"              20)
         (position_x     :float     0.0)
         (position_y     :float     0.0)
         (position_z     :float     0.0)
         (part_number    :integer   20)
         (sequence_no.   :short     1))
```

Global trigger definitions are defined in the file TRIGGER.DEFS, which is used by trigger module 46 in providing trigger signals for scheduler module 42. All trigger definitions are compared to every global database access message by the trigger module in the BCU, and when a match is found, a context message is built and sent by the trigger module to the scheduler module for dispatch to the appropriate KSOS via communication module 38. The format of a typical trigger definition in the language C (with comments) is as follows:

```
(Defks ks-sensor appname domain              /*ks-sensor is KS name, appname is*/
                                             /*application name.*/
                                             /*domain is presently ignored.*/
        :trigger-conditions                  /*followed by list of trigger definitions*/
        (trigger-or                          /*KS triggered on any of*/
                                             /*multiple conditions.*/
                    /*trigger definition #1 for ks-sensor*/
        ((trigger-functions write-attributes) /*global database asses fn*/
         (trigger-structure part)            /*structure name*/
         (trigger-attribute position_x)      /*attribute name*/
         (trigger-value 10)                  /*attribute = 10*/
        )
                    /*trigger definition #2 for ks-sensor*/
        ((trigger-function read-attributes)  /*global database access fn*/
         (trigger-structure part)            /*structure name*/
              /*define context for successful trigger msg, resource mapping of ks.*/
        spawn-permit nil                     /*spawn-one KS (t for spawn always)*/
        :varval-retains t                    /*include data causing trigger msg.*/
        :ksos-id 1                           /*KSOS logical unit no. (−1 for any)*/
```

In the above example, the trigger condition presented indicates that a knowledge source sensor (ks-sensor) associated with the particular knowledge source in question is sent a trigger message in order to either write to a part structure (i.e., one of devices 130) using a value of 10 for the attribute position_x, or read a part structure. When determining the appropriate response to this instruction, searching by the KSP is limited by a conventional tree pruning approach, starting at the function level for all trigger conditions, followed by structure, attribute, and value. A ":spawn-permit" criterium tells the BCU if a knowledge source can be spawned once or many times. If a knowledge source is spawn-once, the first time that the knowledge source sensor is triggered, BCU 106 sends a "start trigger message" to the KSP having a KSOS identification "1" (for the specific knowledge source sensor involved), and an appropriate internal identity number. Any similar trigger conditions occurring thereafter are sent to the same KSOS for use by the same knowledge source identity.

Conversely, if the knowledge source is a spawn-always type, and if the knowledge source identity is equal to −1, every trigger that matches the pattern will cause BCU 106 to send a start trigger message to the least loaded KSOS. In this way, it is ensured that the distribution of processing overhead is equitably shared between the KSPs where possible, but that a specific KSP is assigned a spawn-once knowledge source, for example, if it can or should be run on only that KSP.

While the preferred embodiment of the invention has been illustrated and described, it will be appreciated that various changes can be made therein without departing from the spirit and scope of the invention. Accordingly, the scope of the invention should be defined only by reference to the claims that follow.

The embodiments of the invention in which an exclusive property or privilege is claimed are defined as follows:

1. A blackboard processing system, comprising:

a plurality of knowledge source processors that are configured for parallel processing of computational tasks, so that while one knowledge source processor carries out one computational task, another knowledge source processor carries out another computational task;

a blackboard control unit, physically separate and distinct from said plurality of knowledge source processors, coupled in communication with said plurality of knowledge source processors, said blackboard control unit including a plurality of functional hardware modules, each of said functional hardware modules including a central processing unit, an electronic memory and a communication interface, said plurality of functional hardware modules including:

database means, coupled in communication with the knowledge source processors, for storing and retrieving data received from the knowledge source processors;

communication means, coupled in communication with the knowledge source processors and to the database means, for conveying data to and from specific knowledge source processors and to and from the database means, and for transmitting instructions to the knowledge source processors;

trigger means, coupled in communication with the database means and responsive to data presented to and stored by the database means, for producing a trigger signal upon the occurrence of a predefined condition indicated by that data; and scheduler means, coupled in communication with the knowledge source processors through the communication means and connected to the trigger means to receive the trigger signal produced by the trigger means, for transmitting the instructions through the communication means to the knowledge source processors, the instructions causing a selected knowledge source processor to carry out a specific computational task.

2. The blackboard processing system of claim 1, wherein the scheduler means are further operative to cause data required by the selected knowledge source processor for carrying out the specific computational task to be transmitted through the communication means to the selected knowledge source processor.

3. The blackboard processing system of claim 1, wherein the database means respond to requests for data received from the knowledge source processors through the communication means, and in response to the requests, retrieve data for transmission back to the knowledge source processors that made the requests.

4. The blackboard processing system of claim 1, wherein the functional hardware modules comprising the database means, the communication means, the trigger means, and the scheduler means are interchangeable.

5. The blackboard processing system of claim 1, wherein functions performed by any of the database means, the communication means, the trigger means, and the scheduler means are effected by a plurality of the functional hardware modules to accommodate higher levels of activity for such functions.

6. The blackboard processing system of claim 1, wherein the functional hardware modules are interconnected by a plurality of serial data links to facilitate high-speed data interchange between the functional hardware modules.

7. The blackboard processing system of claim 1, wherein the electronic memory of the functional hardware modules comprise a high-speed random access memory circuit.

8. The blackboard processing system of claim 1, wherein the electronic memory of each functional hardware module stores a plurality of machine instructions that determine whether the functional hardware module operates as the trigger means, the communication means, the database means, or the scheduler means.

9. The blackboard processing system of claim 1, wherein each knowledge source processor includes memory means for storing a knowledge source operating system, and wherein the knowledge source operating system interprets instructions received from the blackboard control unit so that those instructions can be run by the knowledge source processor and translates between a data format used by the knowledge source processor and a data format used by the blackboard control unit if said data formats are different from each other.

10. The blackboard processing system of claim 1, wherein the specific computational tasks that the knowledge source processors are instructed to carry out by the scheduler means each comprise a portion of an overall application that the blackboard processing system is running, and wherein the data used by the knowledge source processors in carrying out the specific computational tasks are stored by the database means so that such data are available to all of the knowledge source processors.

11. The blackboard processing system of claim 1, wherein the scheduler means at times assign a specific computational task to each knowledge source processor and at times select one of the knowledge source processors to carry out the specific computational task based on its computational capabilities and availability at the time of the selection.

12. A blackboard processing system for running an application that includes a plurality of computational processes, at least some of which can be completed in parallel, comprising:

(a) a plurality of parallel processors that carry out the computational processes included in the application; and (b) blackboard control means, physically separate and distinct from the plurality of parallel processors, and coupled in communication with the plurality of parallel processors, said blackboard control means including a plurality of processor modules, each of said processor modules including a central processing unit, an electronic memory and a communication interface, said plurality of processor modules:

(i) providing high-speed data communication to and from the plurality of parallel processors;

(ii) storing, retrieving, and sharing data resulting from computational processes that have been completed by the plurality of parallel processors, to enable other computational processes to be completed by them;

(iii) scheduling the computational processes to run on selected parallel processors based on a capability of the selected parallel processors to carry out specific computational processes and based upon a relative computational load already imposed on the parallel processors, a parallel processor that is less heavily loaded being selected to carry out a specific computational process instead of a parallel processor that is more heavily loaded; and (iv) detecting that a predefined event has occurred based on data supplied by at least one of the plurality of parallel processors that are indicative of such an occurrence, and upon detecting the occurrence of the predefined event, initiating running of one of the computational processes so that the plurality of computational processes are completed in response to the predefined event, the blackboard control means thus insuring that the computational processes included in the application are carried out efficiently by sharing the data and allocating the computational processes among the plurality of parallel processors.

13. The blackboard processing system of claim 12, wherein at least one of the parallel processors at times is selected to simultaneously carry out at least two of the computational processes.

14. The blackboard processing system of claim 12, wherein data required by a specific one of the parallel processors are requested from the blackboard control means, and in response, the blackboard control means retrieve such data and transfer the data to the specific one of the parallel processors that requested the data.

15. The blackboard processing system of claim 12, wherein the blackboard control means transfer data required for carrying out one of the computational processes to a parallel processor that is selected to run that computational process.

16. The blackboard processing system of claim 12, wherein each of said plurality of processor modules carries out a different set of machine instructions to perform a different function of the blackboard control means.

17. The blackboard processing system of claim 16, wherein a plurality of the processor modules are used to perform a single function of the blackboard control means to accommodate higher levels of processing activity required by said single function.

18. The blackboard processing system of claim 16, further comprising a plurality of serial data links that facilitate high-speed data communication between the processor modules.

19. The blackboard processing system of claim 16, wherein the memory circuit comprises a high-speed random access memory circuit for storing data.

20. The blackboard processing system of claim 16, wherein the processor modules are interchangeable.

21. The blackboard processing system of claim 12, wherein each parallel processor includes memory means for storing a knowledge source operating system used to interface the parallel processor to the blackboard control means.

22. The blackboard processing system of claim 21, wherein the memory means of each parallel processor also store a general operating system with which the knowledge source operating system interfaces.

* * * * *

UNITED STATES PATENT AND TRADEMARK OFFICE
CERTIFICATE OF CORRECTION

PATENT NO. : 5,506,999
DATED : April 9, 1996
INVENTOR(S) : T.L. Skillman et al.

It is certified that error appears in the above-indentified patent and that said Letters Patent is hereby corrected as shown below:

| COLUMN | LINE | |
|---|---|---|
| 3 | 63 | "clam" should read --data-- |
| 6 | 25 | "carded" should read --carried-- |

Signed and Sealed this

Thirtieth Day of July, 1996

Attest:

BRUCE LEHMAN

*Attesting Officer*     *Commissioner of Patents and Trademarks*